(12) United States Patent
Hatakeyama

(10) Patent No.: US 6,535,248 B1
(45) Date of Patent: Mar. 18, 2003

(54) CAMERA INCLUDING A MACRO MODE ALARM DEVICE

(75) Inventor: Koki Hatakeyama, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/088,374

(22) Filed: Jun. 2, 1998

(30) Foreign Application Priority Data

Jun. 6, 1997 (JP) ............................................... 9-149142

(51) Int. Cl.[7] ......................... H04N 5/222; H04N 5/225
(52) U.S. Cl. ................................. 348/333.09; 348/341
(58) Field of Search ....................... 348/333.09, 333.04, 348/341; 359/705, 672, 683, 693; 396/373, 374, 377

(56) References Cited

U.S. PATENT DOCUMENTS

| 4,802,020 | A | * | 1/1989 | Miyake et al. | ............... 359/693 |
| 5,099,265 | A | * | 3/1992 | Lee | ............................ 348/333 |
| 5,255,120 | A | * | 10/1993 | Anzai et al. | ................. 359/511 |
| 5,467,226 | A | * | 11/1995 | Watanabe | .................... 359/693 |

FOREIGN PATENT DOCUMENTS

JP  363149629 A * 6/1988

* cited by examiner

*Primary Examiner*—Wendy R. Garber
*Assistant Examiner*—Rashawn N Tillery
(74) *Attorney, Agent, or Firm*—Birch, Stewart, Kolasch & Birch, LLP

(57) ABSTRACT

A camera of the present invention is selectively operable in a normal mode or a macro mode and includes a macro mode alarm device. When the operator of the camera selects the macro mode on a normal/macro mode switch while seeing a subject through an optical finder, a controller feeds an alarm control signal and an LCD (Liquid Crystal Display) control signal to the macro mode alarm device and an electronic finder, respectively. In response, the macro mode alarm device causes a light emitting element disposed in an optical finder to glow or blink, urging the operator to use the electronic finder in place of the optical finder. In addition, the controller turns on power supply to the LCD of the electronic finder so as to allow the operator to use the electronic finder immediately.

16 Claims, 3 Drawing Sheets

CAMERA INCLUDING A MACRO MODE ALARM DEVICE

BACKGROUND OF THE INVENTION

1. Field of the Invention

The present invention relates to a camera including an optical finder and an electronic finder and selectively operable in a normal mode or a macro mode.

2. Description of the Background Art

A camera of the type including finder optics and shooting optics independent of each other is conventional. The problem with this type of camera is that when the range between the camera and a desired subject decreases, a deviation generally referred to as parallax occurs between the range visible through an optical finder and the actual range for a shot. In light of this, it is a common practice to arrange, within the optical finder, both of a field frame to be used when parallax is not critical and a field frame to be used when parallax is critical and corrected the deviation ascribable to parallax beforehand. If the range between the camera and a desired subject measured by range finding means is short and needs parallax correction, then the field frame for parallax correction is displayed in the finder. If the above range is long enough to obviate parallax, then the other field frame for usual shots is displayed in the finder.

However, the conventional scheme selectively using the two different kinds of field frames in accordance with the range between the camera and the subject is not practicable without resorting to the range finding means for calculating the range. The range finding means obstructs the small size, light weight and low cost construction of the camera. Particularly, the range finding means is not feasible for a camera of the kind attaching importance to a small size, light weight and low cost configuration, so that it is difficult to apply the selective use of two different field frames to such a camera.

SUMMARY OF THE INVENTION

It is therefore an object of the present invention to provide a camera including a macro mode alarm device and capable of obviating parallax without resorting to range, finding means.

A camera of the present invention includes an optical finder and an electronic finder selectively used to see a subject therethrough, and is selectively operable in a normal mode suitable for a subject positioned at a long range or a macro mode suitable for a subject positioned at a short range. A mode switch allows the operator of the camera to select either the normal mode or the macro mode. An alarm device produces an alarm in order to urge the operator to use the electronic finder. A controller causes, when the macro mode is selected by the mode switch, the alarm device to produce the alarm.

The controller should preferably cause, when the macro mode is selected by the mode switch, the alarm device to produce the alarm and control the electronic finder in order to activate a display included in the electronic finder.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

A preferred embodiment of the camera in accordance with the present invention to be described hereinafter is implemented as an electronic still camera capable of shooting a desired subject with a solid state imaging device and recording it in a memory card or similar recording medium. The camera is selectively operable in a normal mode suitable for a subject positioned at a long range, e.g., more than 50 cm or a macro mode suitable for a subject positioned at a short range, e.g., less than 50 cm.

Figure 2:
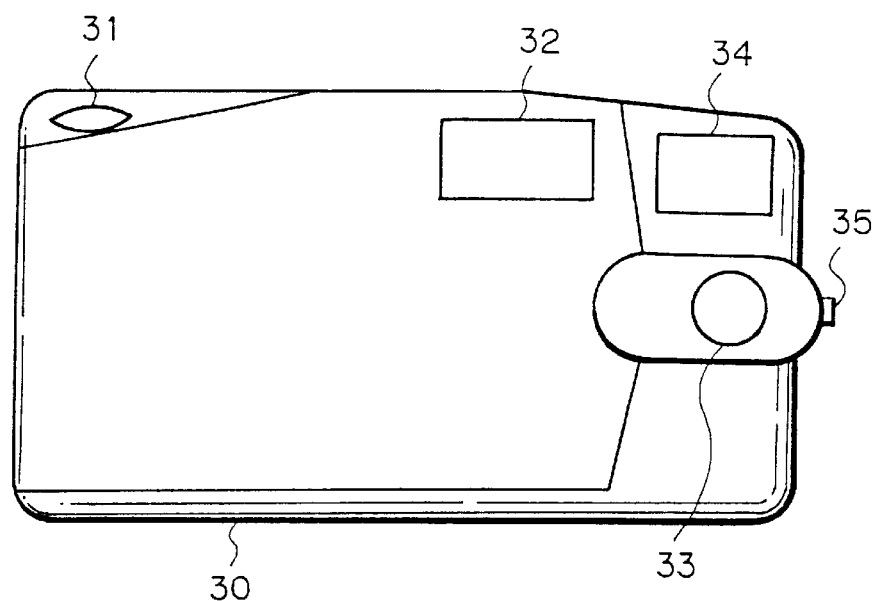
FIG. 2 is a front view of the illustrative embodiment.
Figure 3:
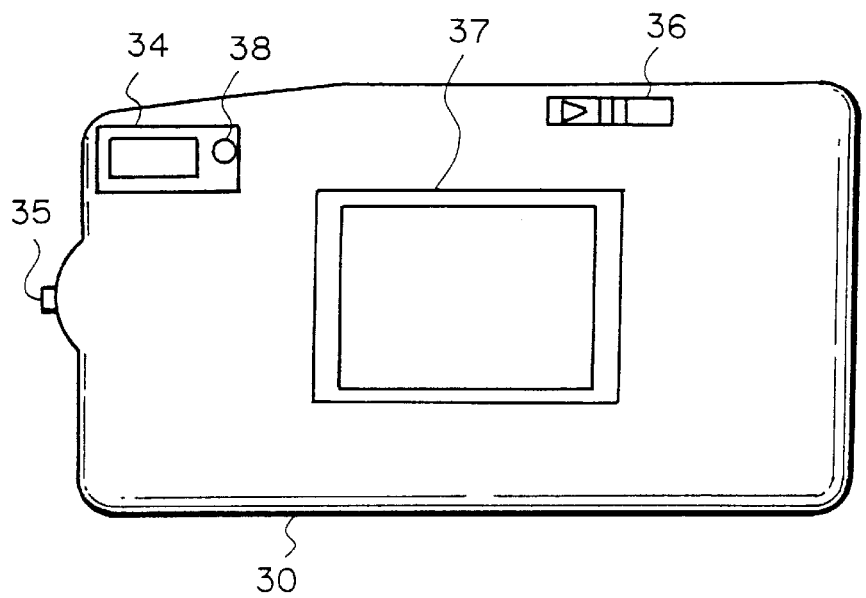
FIG. 3 is a rear view of the illustrative embodiment.

Referring to FIGS. 2 and 3, the electronic still camera embodying the present invention includes a casing 30. A shutter 31, a strobe 32, a lens 33 and an optical finder or viewfinder 34 are mounted on the casing 30. A normal/macro switch 35 for allowing the operator of the camera to select either the normal mode or the macro mode by hand is positioned on one side of the casing 30. A power switch 36 and an electronic finder or viewfinder 37 are positioned on the rear of the casing 30. The power switch 36 is operated to connect or disconnect a power source, not shown, from various sections included in the camera. The electronic finder 37 displays an image to be recorded in a recording medium, not shown, faithfully as it is. A macro mode alarm device 38 is positioned in the optical finder 34. When the operator selects the macro mode, the macro mode alarm device 38 produces an alarm for urging the operator to use the electronic finder 37 in place of the optical finder 34.

Figure 1:
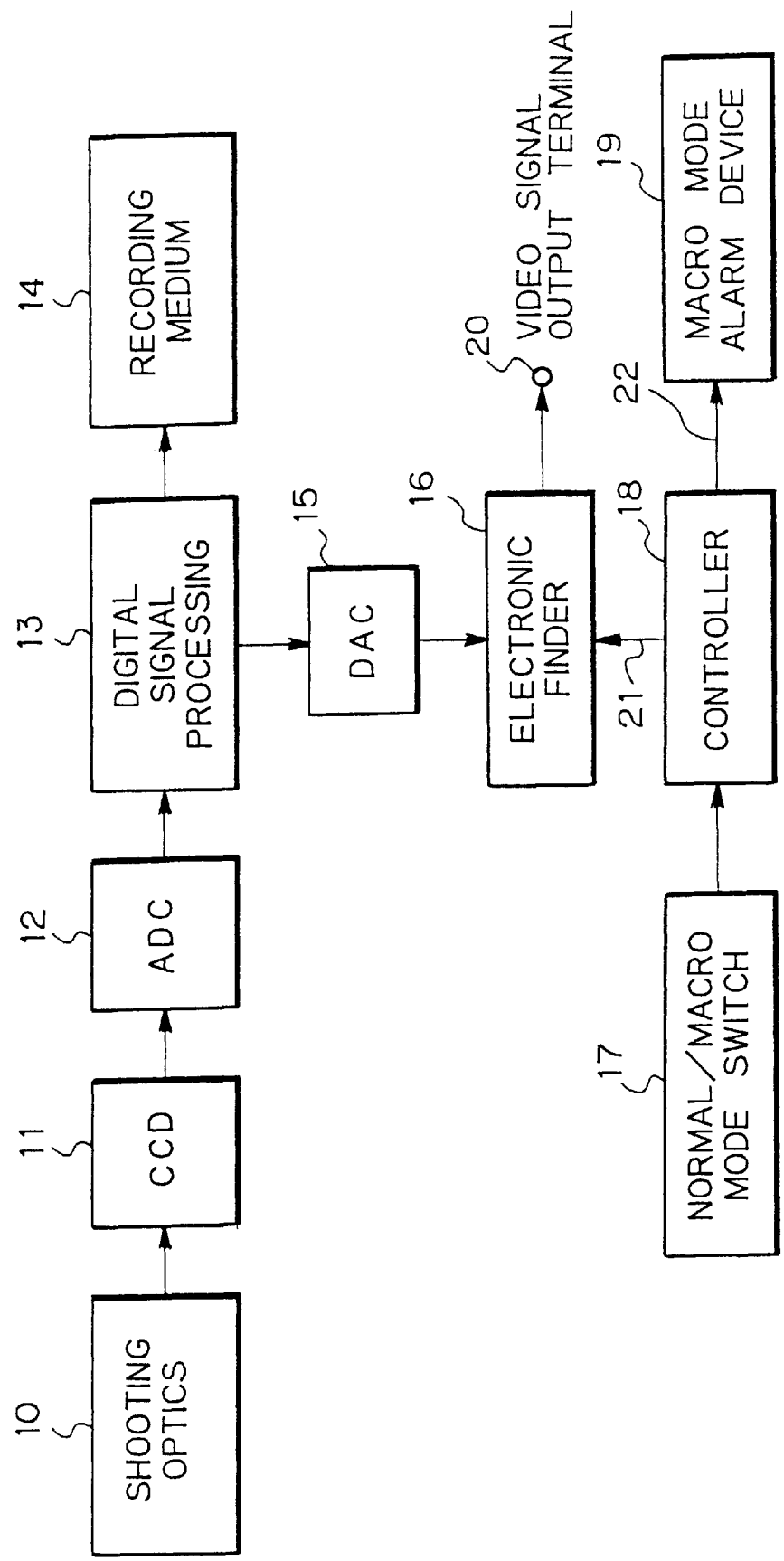
FIG. 1 is a block diagram schematically showing a camera embodying the present invention and including a macro mode alarm device.

FIG. 1 is a block diagram schematically showing the electric arrangement of the illustrative embodiment. As shown, shooting optics 10 includes the lens 33, FIG. 2, and focuses an optical image representative of a subject on the light-sensitive surface of a CCD (Charge Coupled Device) image sensor 11. The focal length of the optics 10 is variable in accordance with the status of the normal/macro mode switch 17. In the illustrative embodiment, a zone focus scheme is used in place of an autofocus scheme in order to promote the small size, light weight and low cost configuration of the camera.

In the normal mode, use is made of pan focus, i.e., the focal length and therefore the depth of field is increased such that the distance between the lens 33 and the CCD image sensor 11 is so set as to implement focusing over a range of, e.g., from 50 cm to infinity. By contrast, in the macro mode, the focal length is reduced such that the distance between the lens 33 and the image sensor 11 is so set as to focus the camera to a subject positioned at a short range, e.g., within 50 cm. The lens 33, for example, is shifted in order to set either one of the above distances between the lens 33 and the image sensor 11 in accordance with the status of the normal/macro mode switch 17.

The CCD image sensor or solid state imaging device 11 transforms the optical image of the subject focused thereto by the shooting optics 10 to a corresponding electric signal. The electric signal is delivered from the image sensor 11 to an analog-to-digital converter (ADC) 12. The ADC 12 converts the electric signal to a digital signal and feeds the digital signal to a digital signal processing 13. The digital signal processing 13 executes real-time processing with the input digital signal. The digital signal processed by the processing 13 is recorded in a recording medium 14 and fed to a digital-to-analog converter (DAC) 15 at the same time. The DAC 15 transforms the digital signal to an analog signal. The analog signal output from the DAC 15 is fed to an electronic finder 16 and a video signal output terminal 20.

The electronic finder 16 corresponds to the electronic finder 37, FIG. 3, and displays the image of the subject on the basis of the analog signal fed from the DAC 15. The finder 16 is implemented by an LCD (Liquid Crystal Display) or similar flat display. The operator of the camera can selectively turn on or turn off power supply to the finder 16. When power supply to the finder 16 is turned off, a controller 18 which will be described later turns it on by sending an LCD control signal 21.

A normal/macro mode switch 17 corresponds to the normal/macro mode switch 35, FIGS. 2 and 3, and allows the operator to select either the normal mode or the macro mode, depending on the distance between the camera and the subject. The switch 17 is connected to the controller 18.

The controller 18 implemented by, e.g., a microprocessor detects the status of the normal/macro mode switch 17 and outputs the LCD control signal 21 and an alarm control signal 22 which controls the operation of a macro mode alarm device 19. The LCD control signal 21 and alarm control signal 22 are fed to the electronic finder 16 and macro mode alarm device 19, respectively. Further, the controller 18 generates, in a preselected procedure, control signals for controlling the various sections of the camera and drive signals for driving them in response to, e.g., the operation of the shutter button 31, FIG. 2.

Figure 4:
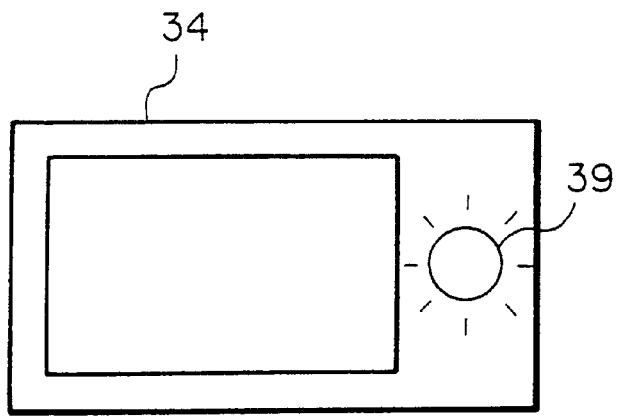
FIGS. 4 and 5 are views each showing a particular configuration of the macro mode alarm device included in the illustrative embodiment.
Figure 5:
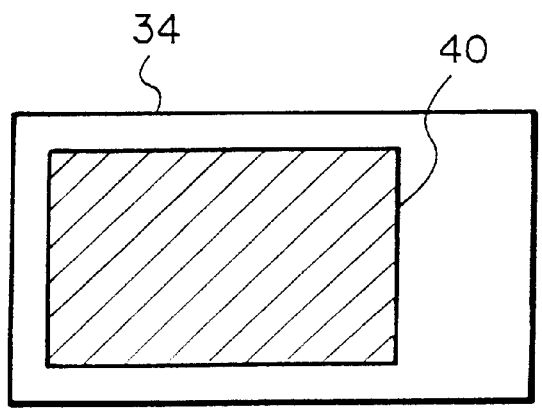

The macro mode alarm device 19 corresponds to the macro mode alarm device 38, FIG. 3. On receiving alarm control signal 22 from the controller 18, the alarm device 19 urges the operator using the optical finder 34 to use the electronic finder 37, FIG. 3. FIGS. 4 and 5 each shows a particular configuration of the alarm device 19. In FIG. 4, the alarm device 19 is implemented by a light emitting element 39 disposed in the optical finder 34 and capable of blinking when the alarm control signal 22 is fed thereto from the controller 18. The light emitting element 39 may be positioned outside, but in the vicinity, of the optical finder 34, if desired. In addition, a sounder may be used in combination with the light emitting element 39 and caused to produce an alert tone at the same time as the element 39 blinks. In FIG. 5, the alarm device 19 is implemented by a mask 40 disposed in the optical finder 34 such that the mask 40 is driven by the alarm control signal 22 to obstruct the operator's view.

The operation of the above embodiment will be described with reference to FIG. 1. Assume that the operator operates the power switch 36, FIG. 3, in order to set up power supply. Then, the optical image of a subject is focused on the light-sensitive surface of the CCD image sensor 11 via the shooting optics 10. The image sensor 11 transforms the optical image to an electric signal and feeds the electric signal to the ADC 12. The resulting digital signal output from the ADC 12 is input to the digital signal processing 13. The digital signal subjected to preselected processing in the digital signal processing 13 is transformed to an analog signal by the DAC 15 and then delivered to the electronic finder 16. If the LCD included in the electronic finder 16 is supplied with power, then the finder 16 displays the real-time image of the subject represented by the analog signal on the LCD. This allows the operator to see the subject through the finder 16 before operating the shutter button 31, FIG. 2.

The operator may see the subject through the optical finder 34 in place of the electronic finder 16. That is, either one of the electronic finder 16 and optical finder 34 may be used, as desired. However, because the LCD of the electronic finder 16 consumes substantial power, a long time of operation of the LCD would reduce a shooting time determined by a battery capacity. In light of this, the operator usually turns off power supply to the LCD and uses the optical finder 34. When the operator presses the shutter button 31, FIG. 3, the optical image of a subject currently incident to the image sensor 11 is sequentially processed by the image sensor 11, ADC 12 and digital signal processing 13 and then written to the recording medium 14.

The alarm to be produced when the shooting mode is switched from the normal mode to the macro mode will be described hereinafter. The operator estimates a distance between the camera and a desired subject with the eye and then select either the normal mode or the macro mode matching with the distance in order to avoid a defocus. In addition, the operator sees the subject through the electronic finder 16 or the optical finder 34, considering the battery capacity and other factors.

First, assume that the operator selects the electronic finder 16 to see a desired subject. Then, the image of the subject to be recorded in the recording medium 14 appears on the LCD of the finder 16 as it is, so that parallax does not occur in either one of the normal mode and macro mode. In addition, whichever the shooting mode selected may be, the operator can confirm whether or not the camera is focused on the subject. It follows that the operator can shoot the subject continuously through the finder 16 without the fear of parallax even when switched the shooting mode from the normal mode to the macro mode. Further, in either one of the two modes, the operator can determine whether or not the current mode is adequate by monitoring the LCD as to defocus.

Assume that the operator selects the optical finder 34 and normal mode and shoots a subject far from the camera. Then, parallax occurs little, and a defocus does not occur at all because of the pan focus scheme. The operator can therefore achieve a faithful shot of the subject. On the other hand, assume that the operator looking at the subject through the optical finder 34 switches the shooting mode from the normal mode to the macro mode. Then, a deviation occurs between the desired scene and the scene to be actually recorded in the recording medium 14 due to parallax, preventing the operator from achieving a faithful shot, In this case, the illustrative embodiment urges the operator switched the shooting mode to use the electronic finder 16 in place of the optical finder 34.

Specifically, when the operator operates the normal/macro mode switch 17 in order to switch the shooting mode from the normal mode to the macro mode, the controller 18 detects the switching operation and feeds the alarm control signal 22 to the macro mode alarm device 19. In response, the macro mode alarm device 19 causes the light emitting element 39 existing in or adjoining the optical finder 34 to glow or blink, thereby arousing the operator's attention. The operator watching the light emitting element 39 glowing or blinking sees that the optical finder 34 must be replaced with the electronic finder 16. This successfully obviates parallax and insures a desirable shot.

When the operator uses the optical finder 34, power supply to the LCD of the electronic finder 16 is usually turned off. In the illustrative embodiment, the controller 18 automatically generates the LCD control signal 21 and feeds it to the electronic finder 16 when detected the replacement of the normal mode with the macro mode. In response, the electronic finder 16 turns on power supply to the LCD and causes the LCD to display the image of the subject based on the analog signal output from the DAC 15. The operator can therefore see the subject through the electronic finder 16 without performing any extra operation. Alternatively, the operator may intentionally turn on power supply to the LCD via a switch, not shown.

In summary, it will be seen that the present invention provides a camera capable of urging, when the operator of the camera replaces a normal mode with a macro mode while using an optical finder, the user to use an electronic finder. As a result, the user uses the electronic finder in the macro mode without fail in order to avoid parallax. If a display included in the electronic finder is held in its OFF state by the operator, it is automatically switched to its ON state on the replacement of the normal mode with the macro mode. This allows the operator to see a subject through the electronic finder immediately without performing any extra operation.

The entire disclosure of Japanese patent application No. 149142/1997 filed on Jun. 6, 1997 including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A camera including an optical finder and an electronic finder selectively used to see a subject therethrough, and selectively operable in a normal mode suitable for a far shot or a macro mode suitable for a near shot, said camera comprising:

a mode switch for allowing an operator of said camera to select either the normal mode or the macro mode;

a controller for outputting, when the macro mode is selected by said mode switch, an alarm control signal; and an alarm device for producing an alarm in accordance with the alarm control signal output from said controller in order to urge the operator to use the electronic finder.

2. A camera in accordance with claim 1, wherein said controller outputs, when the macro mode is selected by said mode switch, a display control signal, and said electronic finder activates a display included in said electronic finder in accordance with the display control signal output from said controller.

3. A camera in accordance with claim 1, wherein said alarm device comprises a light emitting element positioned in a view area of the optical finder and caused to glow to thereby produce the alarm.

4. A camera in accordance with claim 1, wherein said alarm device comprises a light emitting element positioned in a view area of the optical finder and caused to blink to thereby produce the alarm.

5. A camera in accordance with claim 1, wherein said alarm device comprises a light emitting element positioned outside, but in the vicinity, of the optical finder and caused to glow to thereby produce the alarm.

6. A camera in accordance with claim 1, wherein said alarm device comprises a light emitting element positioned outside, but in the vicinity, of the optical finder and caused to blink to thereby produce the alarm.

7. A camera in accordance with claim 1, wherein said alarm device comprises a sounder caused to produce an alert tone to thereby produce the alarm.

8. A camera in accordance with claim 1, wherein said alarm device comprises a mask caused to screen a view area of the optical finder to thereby produce the alarm.

9. A camera in accordance with claim 1, wherein said alarm device comprises a light emitting element positioned in a view area of the optical finder and caused to glow to thereby produce the alarm, and a sounder caused to produce an alert tone to thereby produce the alarm.

10. A camera in accordance with claim 1, wherein said alarm device comprises a light emitting element positioned in a view area of the optical finder and caused to blink to thereby produce the alarm, and a sounder caused to produce an alert tone to thereby produce the alarm.

11. A camera in accordance with claim 1, wherein said alarm device comprises a light emitting element positioned outside, but in the vicinity, of the optical finder and caused to glow to thereby produce the alarm, and a sounder caused to produce an alert tone to thereby produce the alarm.

12. A camera in accordance with claim 1, wherein said alarm device comprises a light emitting element positioned outside, but in the vicinity, of the optical finder and caused to blink to thereby produce the alarm, and a sounder caused to produce an alert tone to thereby produce the alarm.

13. A camera in accordance with claim 1, wherein said alarm device comprises a light emitting element positioned in a view area of the optical finder and caused to glow to thereby produce the alarm, and a mask caused to screen the view area of the optical finder to thereby produce the alarm.

14. A camera in accordance with claim 1, wherein said alarm device comprises a light emitting element positioned in a view area of the optical finder and caused to blink to thereby produce the alarm, and a mask caused to screen the view area of the optical finder to thereby produce the alarm.

15. A camera in accordance with claim 1, wherein said alarm device comprises a light emitting element positioned outside, but in the vicinity, of the optical finder and caused to glow to thereby produce the alarm, and a mask caused to screen a view area of the optical finder to thereby produce the alarm.

16. A camera in accordance with claim 1, wherein said alarm device comprises a light emitting element positioned outside, but in the vicinity, of the optical finder and caused to blink to thereby produce the alarm, and a mask caused to screen a view area of the optical finder to thereby produce the alarm.

* * * * *